US012752731B2

(12) United States Patent
Takahashi et al.

(10) Patent No.: US 12,752,731 B2
(45) **Date of Patent: *Oct. 6, 2026**

(54) OCCUPANT PROTECTION DEVICE

(71) Applicant: TOYODA GOSEI CO., LTD., Kiyosu (JP)

(72) Inventors: Hitomi Takahashi, Kiyosu (JP); Wataru Miura, Kiyosu (JP); Yasushi Masuda, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/275,172

(22) Filed: Jul. 21, 2025

(65) Prior Publication Data

US 2025/0346204 A1 Nov. 13, 2025

Related U.S. Application Data

(63) Continuation of application No. 18/328,021, filed on Jun. 2, 2023, now Pat. No. 12,391,204.

(30) Foreign Application Priority Data

Jun. 27, 2022 (JP) ................................ 2022-102939

(51) Int. Cl.
*B60R 21/02* (2006.01)

(52) U.S. Cl.
CPC ...... *B60R 21/02* (2013.01); *B60R 2021/0206* (2013.01)

(58) Field of Classification Search
CPC ........... B60R 21/02; B60R 2021/0206; B60R 21/207
See application file for complete search history.

(56) References Cited

U.S. PATENT DOCUMENTS

| | | | | |
|---|---|---|---|---|
| 9,669,798 | B1 | 6/2017 | Maitland | |
| 10,682,578 | B1 * | 6/2020 | Malatek | B60R 21/18 |
| 10,974,626 | B2 | 4/2021 | Yilma et al. | |
| 11,247,633 | B1 * | 2/2022 | Schneider | B60R 21/207 |
| 2016/0272147 | A1 | 9/2016 | Fisher | |
| 2016/0303943 | A1 | 10/2016 | Arens et al. | |

(Continued)

FOREIGN PATENT DOCUMENTS

| | | | |
|---|---|---|---|
| CN | 104039603 | A | 9/2014 |
| JP | 2007-015541 | A | 1/2007 |
| WO | 2023025482 | A1 | 3/2023 |

*Primary Examiner* — Jason D Shanske
*Assistant Examiner* — Shams Dhanani
(74) *Attorney, Agent, or Firm* — Posz Law Group, PLC

(57) ABSTRACT

An occupant protection device includes a seat having a seat portion and a backrest portion, an elongated restraining member for restraining an occupant in the seat, and a take-up unit that takes up the restraining member. The restraining member is fed out from a housing portion of the seat and pulled up toward an upper end side of the backrest portion in accompaniment to an operation of the take-up unit, forming an occupant supporting portion and a pulling portion. The occupant supporting portion supports a back face side of left and right thigh portions of the occupant. The pulling portion extends from both left and right ends of the occupant supporting portion to the upper end side of the backrest portion, and restrains the occupant against the backrest portion.

8 Claims, 6 Drawing Sheets

(56) References Cited

U.S. PATENT DOCUMENTS

| | | | |
|---|---|---|---|
| 2017/0088022 | A1 | 3/2017 | Troyer |
| 2021/0229617 | A1 | 7/2021 | Jaradi et al. |
| 2021/0370861 | A1 | 12/2021 | Matsushita et al. |
| 2022/0274555 | A1 | 9/2022 | Matsushita |
| 2022/0297628 | A1 | 9/2022 | Natsume |
| 2022/0324402 | A1 | 10/2022 | Einspahr |
| 2022/0410832 | A1* | 12/2022 | Kang ................ B60R 21/01552 |
| 2023/0012314 | A1* | 1/2023 | Matsushita ........ B60N 2/42763 |

* cited by examiner

OCCUPANT PROTECTION DEVICE

The present application is a continuation application of U.S. Utility patent application Ser. No. 18/328,021 filed on Jun. 2, 2023, which is based on and claims the benefit of priority from Japanese Patent Application No. 2022-102939 of Takahashi et al., filed on Jun. 27, 2022, the disclosures of which are hereby incorporated into the present application by reference.

BACKGROUND

Technical Field

The present invention relates to an occupant protection device for protecting an occupant seated in a seat.

Description of Related Art

A configuration wherein an occupant is restrained in a seat by a restraining member is already known as an occupant protection device that protects an occupant seated in a seat. Also, a configuration wherein left and right shoulder portions of an occupant are restrained against a backrest portion by left and right restraining members being brought into contact with front face sides of the left and right shoulder portions respectively of the occupant is disclosed in JP No. 2007-15541A.

However, the configuration described in JP No. 2007-15541A is such that a lower end side of each of the left and right restraining members is fixed to a seat. Because of that, a region where the occupant is restrained by the restraining members is limited to a vicinity of either shoulder. In order to protect an occupant, it is desirable that movement of the occupant in a direction away from the seat can be restricted by restraining not only a vicinity of either shoulder of the occupant, but as wide a region as possible.

SUMMARY

An object of the invention is to provide an occupant protection device that can appropriately restrict a movement of an occupant in a direction away from a seat by restraining a wide region of a body of the occupant.

A representative configuration of an occupant protection device according to the invention is as follows.

An occupant protection device includes:

a seat having a seat portion and a backrest portion;

an elongated restraining member for restraining an occupant in the seat, one end portion in a longitudinal direction of the restraining member being disposed on a left top end side of the backrest portion, another end portion of the restraining member being disposed on a right top end side of the backrest portion, the restraining member being caused to pass from the one end portion to the other end portion through a left side face of the backrest portion, a left side face of the seat portion, a front face of the seat portion, a right side face of the seat portion, and a right side face of the backrest portion, the restraining member being housed in the seat; and a take-up unit that takes up at least one of the one end portion and the other end portion of the restraining member, wherein the restraining member is fed out from a housing portion of the seat and pulled up toward an upper end side of the backrest portion in accompaniment to an operation of the take-up unit, forming an occupant supporting portion, which supports a back face side of left and right thigh portions of the occupant, and a pulling portion that extends from both left and right ends of the occupant supporting portion to the upper end side of the backrest portion, and restrains the occupant against the backrest portion.

DESCRIPTION OF THE PREFERRED EMBODIMENTS

Figure 1:
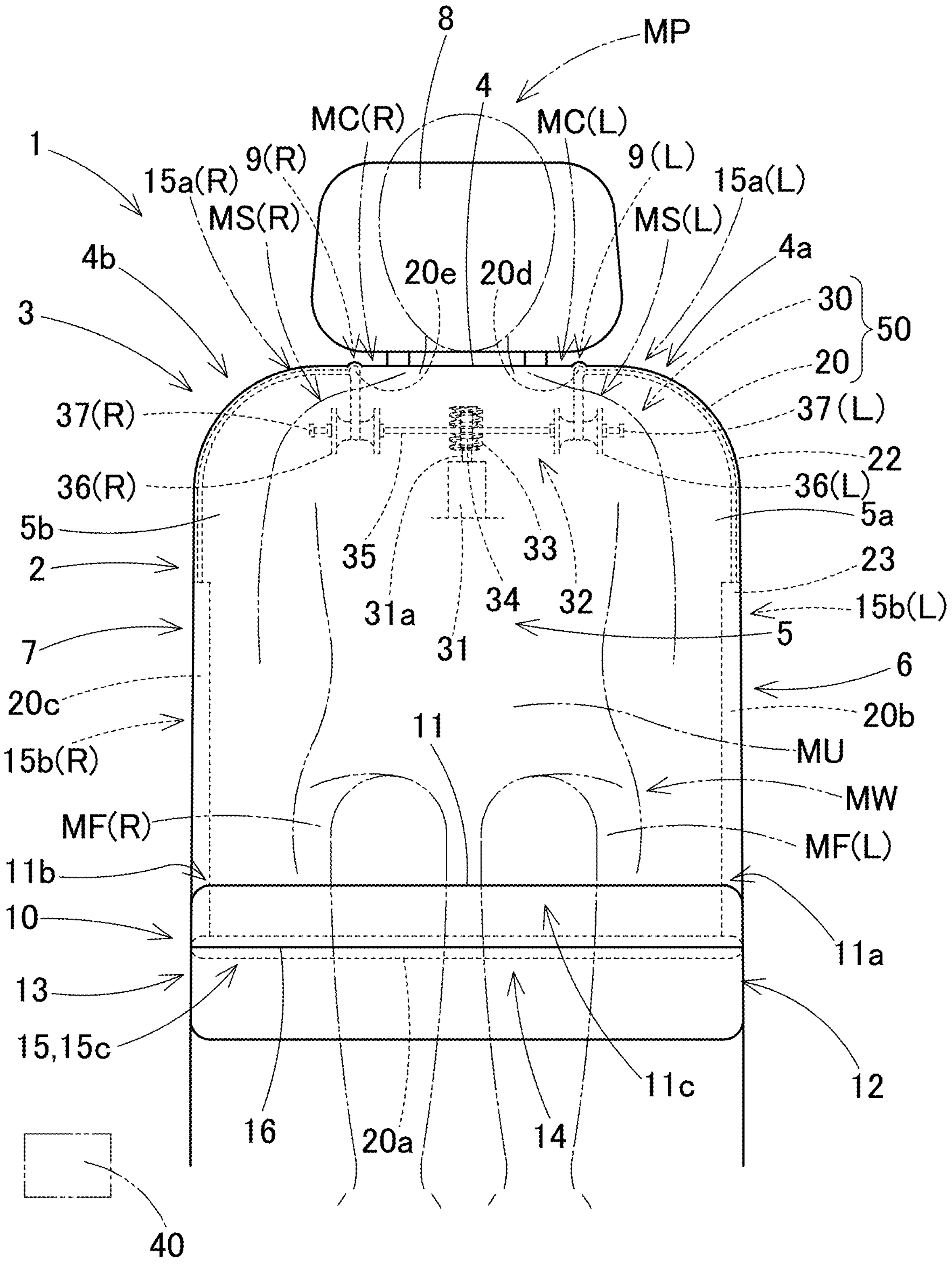
FIG. 1 is a schematic front view of an occupant protection device according to one embodiment of the invention.

Preferred embodiments of the invention are described below with reference to accompanying drawings. However, the invention is not limited to the embodiments disclosed herein. All modifications within the appended claims and equivalents relative thereto are intended to be encompassed in the scope of the claims.

Hereafter, an occupant protection device 50 according to an embodiment of the invention will be described. As shown in FIGS. 1 to 4, the occupant protection device 50 is mounted on a seat 1 that includes a seat portion 10, on which an occupant MP of a vehicle sits, and a backrest portion 2. The occupant protection device 50 includes a restraining member 20 and a take-up device 30 (a take-up portion).

A headrest portion 8 is disposed in the backrest portion 2 of the seat 1 in such a way as to extend upward from an upper end face 4 of an upper end portion 3. A front face 5 of the backrest portion 2 is a region that receives an upper body MU of the occupant MP. Also, a seat face 11, which is an upper face of the seat portion 10, is a region that receives the seated occupant MP from below.

Also, a feeding port 9 (L and R) through which the restraining member 20 is fed is disposed in the upper end face 4 in a vicinity of a left-right direction center of the upper end portion 3 of the backrest portion 2, that is, in a vicinity of a left and right of the headrest portion 8, or in more detail, in a vicinity above left and right collarbones MC (L and R) of the seated occupant MP. An upper portion 15*a* (L and R) of a housing portion 15 that houses the restraining member 20 is disposed from the left and right feeding ports 9 (L and R) to left and right edge 4*a* and 4*b* sides in the upper end face 4 of the backrest portion 2.

The housing portion 15 is of a recessed groove form, and is formed in the left and right edges 4*a* and 4*b* of the upper end face 4 of the backrest portion 2, left and right edge 5*a* and 5*b* sides of the front face 5 of the backrest portion 2, left and right edge 11*a* and 11*b* sides of the seat face 11 of the seat portion 10, and a front face 14 of the seat portion 10. Specifically, the housing portion 15 is configured of the upper portion 15*a* (L and R) extending left and right from the feeding ports 9L and 9R, a side portion 15*b* (L and R) that continues from the upper portion 15*a* (L and R), passes through left and right side faces 6 and 7 of the backrest portion 2, and links with left and right side faces 12 and 13 of the seat portion 10, and a front portion 15*c* that links with the side portion 15*b* (L and R) and is disposed in the front face 14 of the seat portion 10. The housing portion 15 is formed by providing a slit 16 in a fabric provided on a surface side of the seat 1.

The restraining member 20 is an elongated member having flexibility. A left end portion 20*d* that is one end portion of the restraining member 20 in a longitudinal direction and a right end portion 20*e* that is another end portion of the restraining member 20 in the longitudinal direction are disposed on a top end portion 3 side of the backrest portion 2. The restraining member 20 is caused to pass from the left end portion 20*d* to the right end portion 20*e* thereof, through the left edge 5*a* (a left side face) of the backrest portion 2, the left edge 11*a* (a left side face) of the seat portion 10, a front edge 11*c* (a front face) of the seat portion 10, the right edge 11*b* (a right side face) of the seat portion 10, and the right edge 5*b* (a right side face) of the backrest portion 2, and is housed in the housing portion 15 of the seat 1 formed therein. In other words, the restraining member 20 is housed in the housing portion 15 of the seat 1 in an approximate U-form as seen from above in such a way as to pass from both the left and right edge 5*a* and 5*b* sides of the backrest portion 2 through both the left and right edge 11*a* and 11*b* sides of the seat portion 10, and be linked on a front edge 11*c* side of the seat portion 10.

Figure 5:
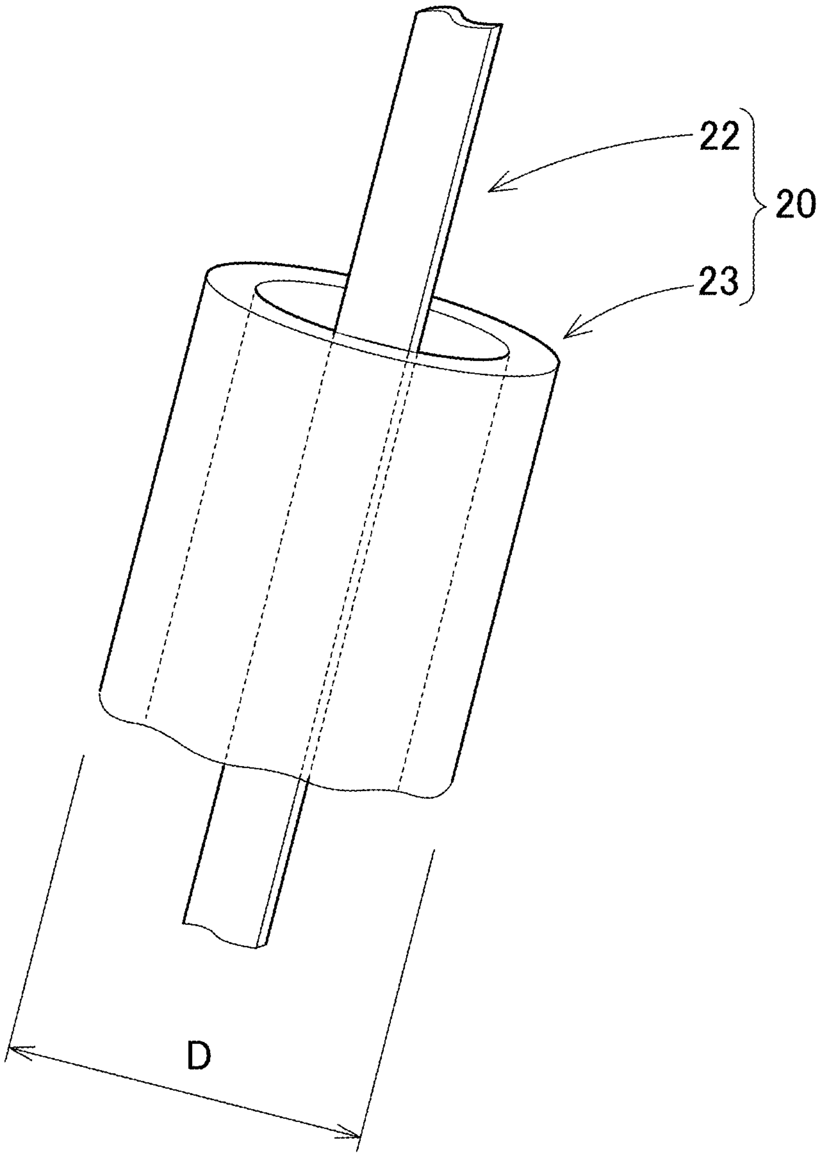
FIG. 5 is a partially broken sectional view of a restraining member in the occupant protection device.

The restraining member 20 is configured of a strip-form core member 22, which is formed of cloth or the like that has flexibility and stretches little, and an approximately cylindrical tube member 23 that covers the core member 22 and is formed of a synthetic resin or the like, such as polypropylene, having flexibility (refer to FIG. 5). The core member 22 is linked to a take-up roller 36 (L and R) of the take-up device 30. The tube member 23 is of a length that is housed in the front portion 15*c* and a lower-side region of the side portion 15*b* (L and R), leaving an upper end side, of the housing portion 15. An external diameter dimension D of the tube member 23 is in the region of 20 to 50 mm (approximately 30 mm in the present embodiment).

The take-up device 30 is disposed on the upper end portion 3 side of the backrest portion 2, and is coupled to the left end portion 20*d* and the right end portion 20*e* of the restraining member 20. The take-up device 30 is configured in such a way as to be able to wind the restraining member 20, which is in a housed state when the take-up device 30 operates, up to the upper end portion 3 side of the backrest portion 2.

The take-up device 30 of the present embodiment includes a motor 31 that acts as a drive source, and a take-up mechanism 32 that takes up the restraining member 20 using a driving force of the motor 31. An operation of the motor 31 is controlled by a control device 40, and when operating, the motor 31 drives a drive shaft 31*a* so as to rotate. A signal from an collision predicting sensor (not illustrated), such as a millimeter-wave radar, that senses that a collision is to occur before an actual collision of a vehicle is input into the control device 40. The control device 40 drives the motor 31 so as to rotate when the collision predicting sensor predicts a collision of the vehicle.

The take-up mechanism 32 is supported in such a way as to be able to rotate by a bearing 37 (L and R) in the upper end portion 3 of the backrest portion 2, and includes a rotary shaft 35 disposed in such a way that a rotational axis line direction thereof follows a left-right direction, a worm gear 33 attached to the drive shaft 31*a* of the motor 31, a worm wheel 34 that is attached to the rotary shaft 35 and meshes with the worm gear 33, and the two left and right take-up rollers 36 (L and R) fixed to the rotary shaft 35. The left and right take-up rollers 36 (L and R) wind the left end portion 20*d* and the right end portion 20*e* respectively of the restraining member 20. In accompaniment to a rotation of the drive shaft 31*a* of the motor 31, the worm wheel 34 meshing with the worm gear 33 rotates, and the rotary shaft 35 rotates, whereby the left and right take-up rollers 36 (L and R) rotate in such a way as to take up the restraining member 20. The left and right take-up rollers 36 (L and R) are disposed immediately below the left and right feeding ports 9 (L and R).

The motor 31 and the bearing 37 (L and R) are held in an unshown bracket that extends from a seat back frame disposed in the backrest portion 2. The control device 40 is disposed on a vehicle body side in front of the seat 1.

When the take-up device 30 operates, the restraining member 20 leaves the housing portion 15, is fed out to an exterior, forms an occupant supporting portion 25, which supports a back face MFb side of left and right thigh portions MF (L and R) of the occupant MP, and left and right pulling portions 26 (L and R), which extend one each from left and right end portions 25*a* and 25*b* of the occupant supporting portion 25 to the upper end portion 3 side of the backrest portion 2, and restrains the occupant MP against a front face 5 side of the backrest portion 2.

The restraining member 20 is configured of the core member 22 and the tube member 23, and the core member 22 in regions of the left end portion 20*d* and the right end portion 20*e* of the restraining member 20 disposed on the upper end portion 3 side of the backrest portion 2 passes through the left and right feeding port 9 (L and R) respectively, and is wound around the take-up roller 36 (L and R). The left end portion 20*d* and the right end portion 20*e* of the core member 22 are exposed from the tube member 23, and are wound around the take-up roller 36 (L and R). The occupant supporting portion 25 and the pulling portion 26 (L and R) of the restraining member 20 are both in a state wherein the core member 22 is caused to be disposed in an interior of the tube member 23. The tube member 23 is of a length dimension such that when the restraining member 20 is housed in the housing portion 15, the tube member 23 is disposed in the front portion 15*c* and a region of the left and right side portions 15*b* (L and R) excepting an upper end side, and is set in such a way as not to interfere at all with the front face 5 side of the backrest portion 2 on a peripheral edge of the feeding port 9 (L and R) when the restraining member 20 is taken up. In other words, the tube member 23 is set in such a way as not to come into contact at all with the front face 5 side of the backrest portion 2, thereby avoiding buckling deformation.

Figure 6A:
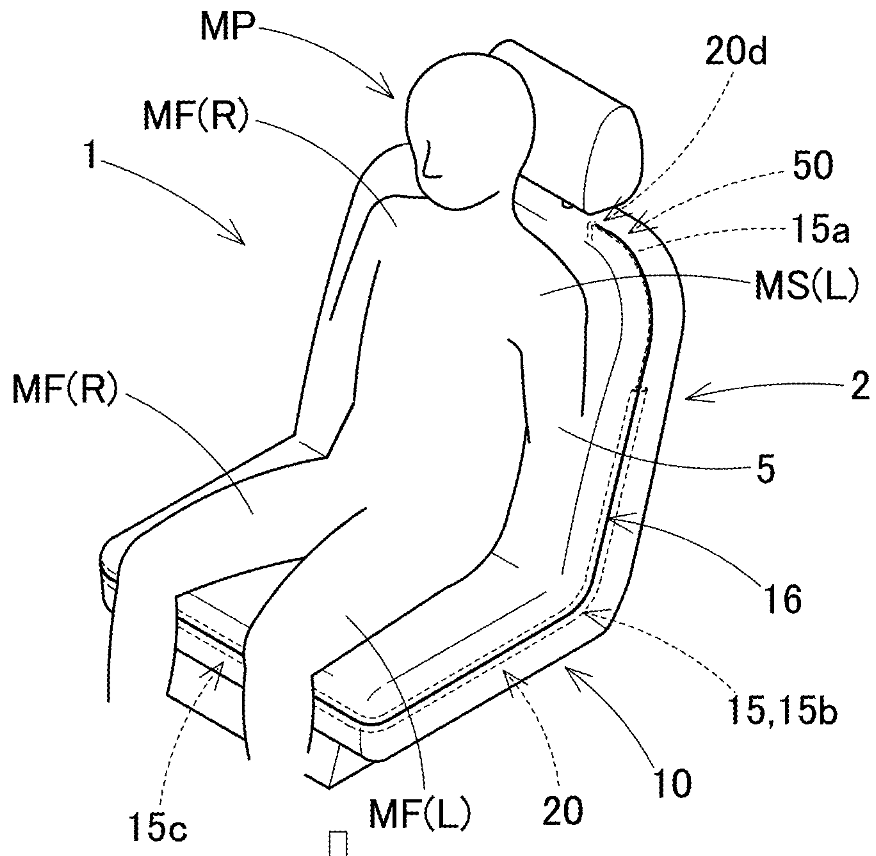
FIGS. 6A and 6B are schematic perspective views before and after an operation of the occupant protection device.
Figure 6B:
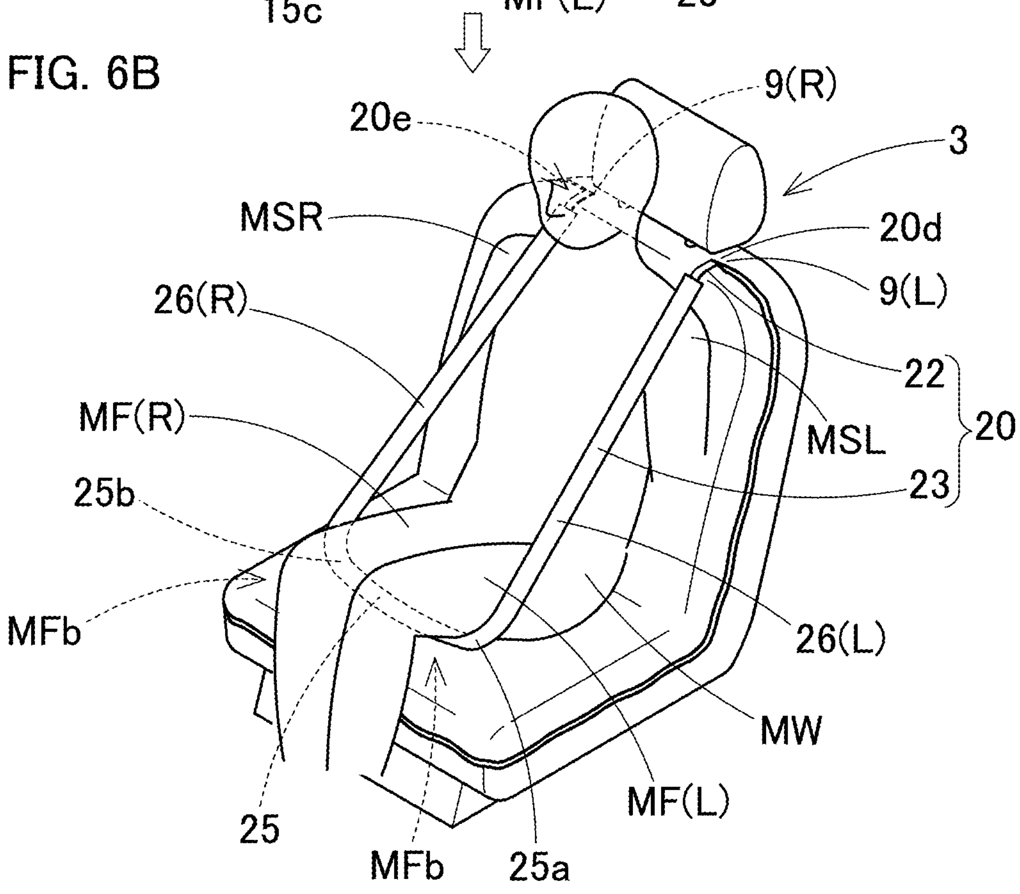

The occupant protection device 50 is such that when a collision of the vehicle is predicted in a state wherein the occupant MP is seated in the seat 1, the control device 40 causes the take-up device 30 to operate, driving the motor 31 in such a way as to rotate. Because of this, the take-up mechanism 32 of the take-up device 30 is driven. That is, the drive shaft 31*a* of the motor 31 is driven in such a way as to rotate, the worm gear 33 attached to the drive shaft 31*a* rotates, the worm wheel 34 meshing with the worm gear 33 rotates, and the rotary shaft 35 to which the worm wheel 34 is attached rotates. Because of this, the take-up roller 36 (L and R) attached to the rotary shaft 35 rotates, and winds the left end portion 20*d* side and the right end portion 20*e* side of the restraining member 20 in such a way as to be pulled out from the feeding port 9 (L and R). Because of this, the restraining member 20 is such that the left end portion 20*d* and the right end portion 20*e* are taken up to the upper end portion 3 side of the backrest portion 2 by the take-up device 30 disposed on the upper end portion 3 side of the backrest portion 2, the restraining member 20 is pulled up (refer to FIGS. 6A and 6B) from a state of being housed on the left and right edge 11*a*, 11*b*, 5*a*, and 5*b* sides of the seat portion 10 and the backrest portion 2 (refer to FIGS. 1 and 3), and the occupant supporting portion 25 of the restraining member 20 is such that both the left and right end portions 25*a* and 25*b* thereof are pulled by the pulling portion 26 (L and R) while coming into contact with the back face MFb side of the left and right thigh portions MF (L and R) of the occupant MP. Because of this, the left and right thigh portions MF (L and R) are lifted up by the occupant supporting portion 25, and the upper body MU of the occupant MP attains a state of being pressed against the front face 5 side of the backrest portion 2. That is, the left and right thigh portions MF (L and R) are held by the occupant supporting portion 25 of the restraining member 20, and the occupant MP is in close contact with the front face 5 side of the backrest portion 2. The occupant MP with this posture is in a state of being restrained by not only a vicinity of both shoulders, but also the upper body MU, including a lower back portion MW, being held against the front face 5 side of the backrest portion 2 of the seat 1. Because of this, movement of the occupant MP in a direction (frontward) away from the seat 1, and a movement deviating to left or right, are restricted, a state wherein the occupant MP is seated in the seat 1 is maintained, and the occupant MP is appropriately protected.

Consequently, according to the occupant protection device 50 of the present embodiment, movement of the seated occupant MP in a direction away from the seat 1 is appropriately restricted, and the occupant MP can be protected.

Also, the seated occupant MP is restrained in such a way as to be held against the backrest portion 2 side when the occupant protection device 50 operates, meaning that even when the seat 1 is oriented in various directions in a state wherein the seat 1 can be rotated in a left-right direction and the like of the vehicle, the occupant MP is held in such a way as to be pressed against the backrest portion 2 side when the occupant protection device 50 operates, and a good protection performance can be demonstrated.

When the restraining member 20 is taken up and the occupant supporting portion 25 lifts up the thigh portion MF (L and R), the operation of the take-up device 30 is stopped in such a way that a height dimension H (refer to FIG. 4) to which a knee MK is lifted up is in the region of 10 to 30 mm (in the region of 20 mm in the present embodiment).

Also, the restraining member 20 is configured of the core member 22 that has a flexibility and is taken up by the take-up device 30, and the tube member 23 that has a flexibility and covers the core member 22. Because of this, the take-up device 30 takes up the core member 22 when taking up the restraining member 20, meaning that even when the tube member 23 comes into contact with the occupant MP, the seat portion 10 of the seat 1, or the backrest portion 2, and has difficulty in moving due to frictional resistance, sliding of the core member 22, which passes through the interior of the tube member 23, with respect to the occupant MP, the seat portion 10 of the seat 1, and the backrest portion 2 is restricted, the core member 22 is pulled, and the occupant supporting portion 25 can be smoothly pulled upward.

Also, the take-up device 30 is configured in such a way as to be able to take up both the left end portion 20*d* and the right end portion 20*e* of the restraining member 20. Because of this, the restraining member 20 is taken up in a state wherein left-right balance is good, left and right thigh portions MFL and MFR of the occupant MP are lifted up with left-right uniformity, and the occupant MP can be restrained against the backrest portion 2 side. When the aforementioned point is not taken into consideration, a configuration wherein one of the left end portion 20*d* and the right end portion 20*e* of the restraining member 20 is fixed, and only the other is taken up, may be adopted.

Figure 2:
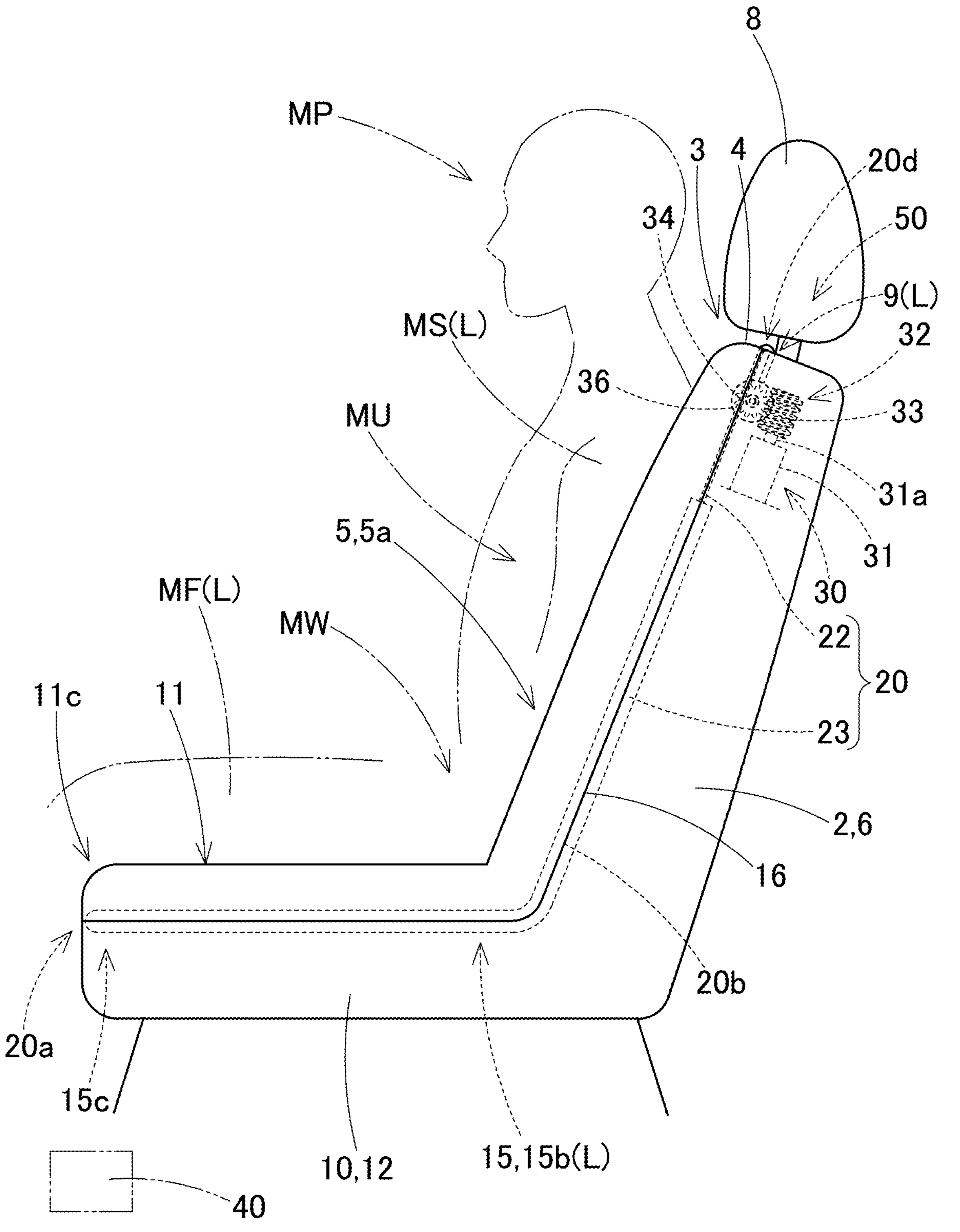
FIG. 2 is a schematic left side view of the occupant protection device.
Figure 3:
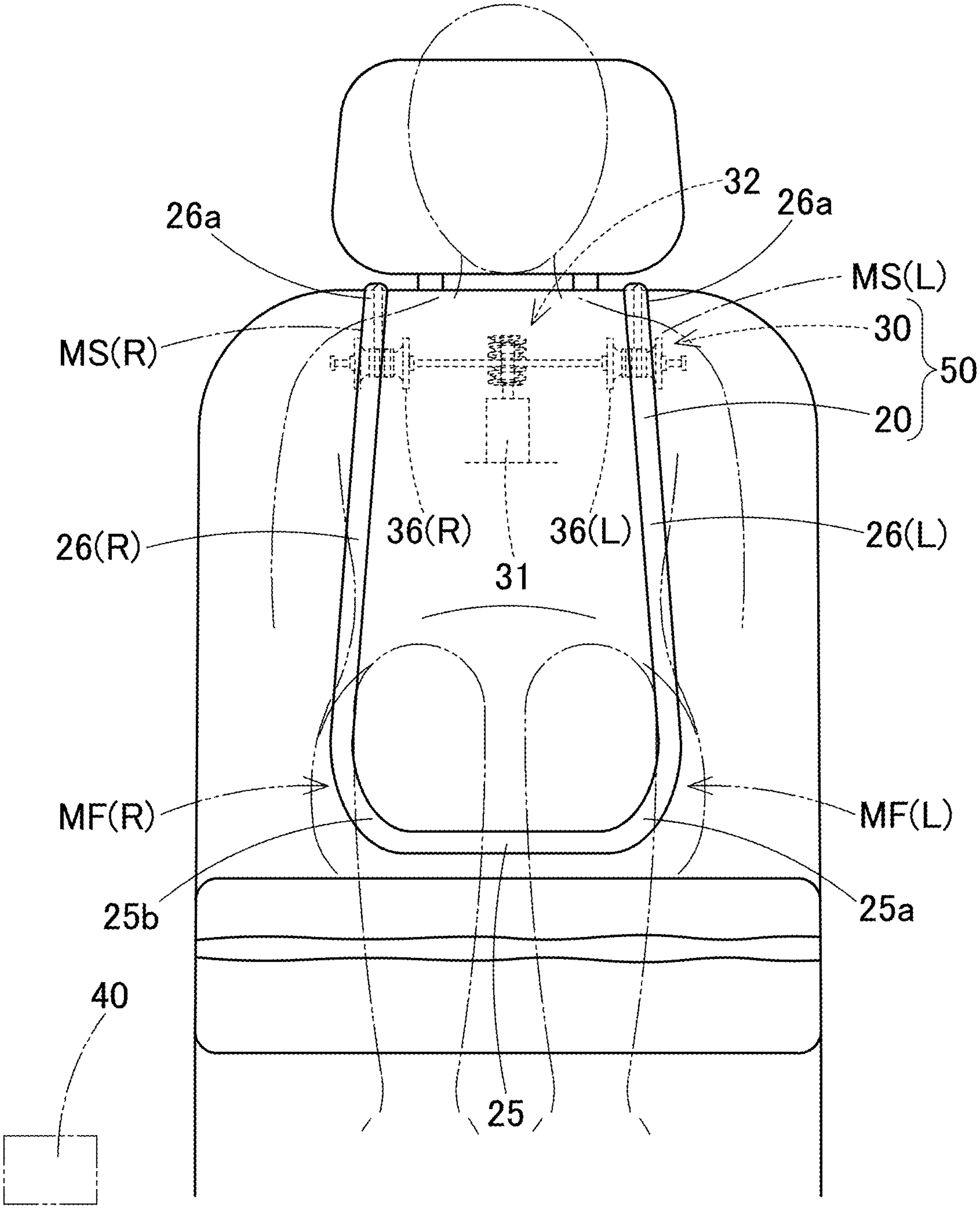
FIG. 3 is a schematic front view of the occupant protection device when operating.
Figure 4:
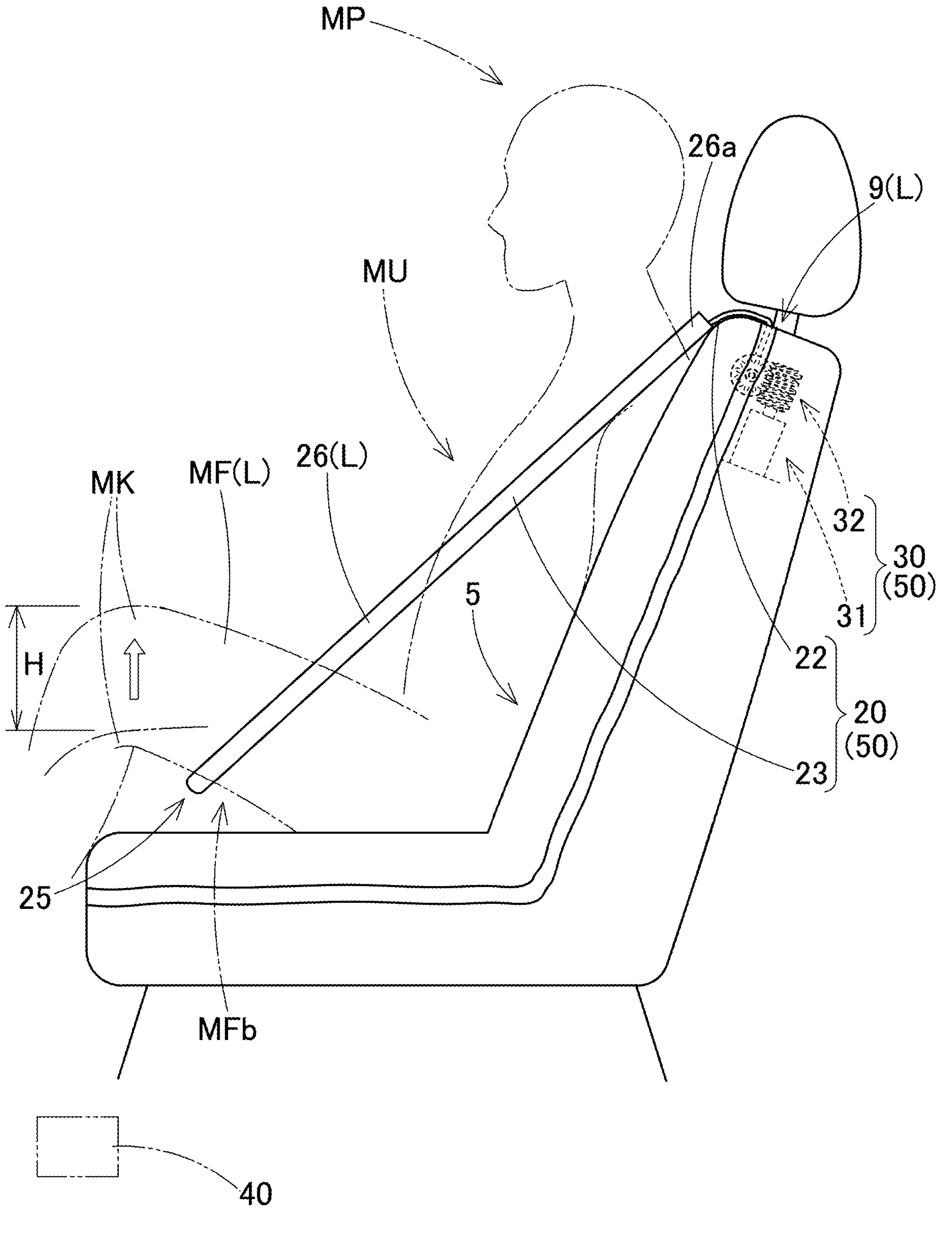
FIG. 4 is a schematic left side view of the occupant protection device when operating.

Also, the left end portion 20*d* and the right end portion 20*e* of the restraining member 20 are disposed aligned left to right in a vicinity of the center of the backrest portion 2. This means that when the restraining member 20 is taken up by the take-up device 30, as shown in FIGS. 2 and 4, the occupant supporting portion 25 of the restraining member 20 lifts up the left and right thigh portions MF (L and R) of the occupant MP from below, and an upper end portion 26*a* side of the left and right pulling portions 26 (L and R) can restrain a front face side of left and right shoulder portions MS (L and R) of the occupant MP. Consequently, the occupant MP becoming detached forward from the backrest portion 2, or deviating left or right, is further restricted, and the occupant MP is appropriately restrained against the backrest portion 2, and can be protected.

What is claimed is:

1. An occupant protection device, comprising:

a seat having a seat portion and a backrest portion;

an elongated restraining member for restraining an occupant in the seat, one end portion in a longitudinal direction of the restraining member being disposed on a left top end side of the backrest portion, another end portion of the restraining member being disposed on a right top end side of the backrest portion, the restraining member being caused to pass from the one end portion to the other end portion through a left side face of the backrest portion, a left side face of the seat portion, a front face of the seat portion, a right side face of the seat portion, and a right side face of the backrest portion, the restraining member being housed in the seat; and a take-up unit that takes up at least one of the one end portion and the other end portion of the restraining member;

a motor that operates to drive the take-up unit to take up the at least one of the one end portion and the other end portion; and a control device that controls the motor to operate, wherein the restraining member is fed out from a housing portion of the seat and pulled up toward an upper end side of the backrest portion in accompaniment to an operation of the take-up unit, forming an occupant supporting portion, which supports a back face side of left and right thigh portions of the occupant, and a pulling portion that extends from both left and right ends of the occupant supporting portion to the upper end side of the backrest portion, and restrains the occupant against the backrest portion.

2. The occupant protection device according to claim 1, wherein the restraining member includes a core member that has flexibility and is taken up by the take-up unit, and a tube member that has flexibility and covers the core member.

3. The occupant protection device according to claim 1, wherein the take-up unit can take up both the one end portion and the other end portion of the restraining member.

4. The occupant protection device according to claim 3, wherein the one end portion and the other end portion of the restraining member are disposed aligned left to right in a vicinity of a center of the backrest portion, and the restraining member is configured in such way as to be able to restrain a front face side of left and right shoulder portions of the occupant when the take-up unit operates.

5. The occupant protection device according to claim 1, wherein the restraining member is housed in a groove formed in the left side face of the backrest portion, the left side face of the seat portion, the front face of the seat portion, the right side face of the seat portion, and the right side face of the backrest portion.

6. The occupant protection device according to claim 1, wherein the control device is further configured to receive a signal from a sensor configured to sense that a collision is to occur before an actual collision, and responsive to the signal indicating that the collision is to occur, control the motor to operate to drive the take-up unit.

7. The occupant protection device according to claim 1, when the take-up unit operates to take up the at least one of the one end portion and the other end portion, the restraining member leaves the housing portion through a slit and the take-up unit rolls the restraining member up toward the upper end side of the backrest portion.

8. The occupant protection device according to claim 1, wherein the take-up unit is further configured to stop the motor from operating when an end portion of the occupant supporting portion reaches a predetermined height dimension.

* * * * *